(12) United States Patent
Hein et al.

(10) Patent No.: US 8,220,592 B2
(45) Date of Patent: Jul. 17, 2012

(54) MOTION CONTROL APPARATUS

(75) Inventors: Dave Hein, Oakdale, MN (US); Jeff Haack, Shoreview, MN (US); Kevin Weiss, Stillwater, MN (US); Jeff Hermes, Shoreview, MN (US); Aaron Lehto, Duluth, MN (US); Mike Henk, Spooner, WI (US)

(73) Assignee: Nexen Group, Inc., Vadnais Heights, MN (US)

( * ) Notice: Subject to any disclaimer, the term of this patent is extended or adjusted under 35 U.S.C. 154(b) by 548 days.

(21) Appl. No.: 12/447,284

(22) PCT Filed: Oct. 26, 2007

(86) PCT No.: PCT/US2007/082664
§ 371 (c)(1),
(2), (4) Date: Nov. 16, 2009

(87) PCT Pub. No.: WO2008/055066
PCT Pub. Date: May 8, 2008

(65) Prior Publication Data
US 2010/0065383 A1 Mar. 18, 2010

Related U.S. Application Data

(60) Provisional application No. 60/863,274, filed on Oct. 27, 2006.

(51) Int. Cl.
*F16D 55/08* (2006.01)
(52) U.S. Cl. ............................................. 188/67; 188/44
(58) Field of Classification Search ...................... 188/43, 188/44, 67, 72.3–72.7; 74/89.32
See application file for complete search history.

(56) References Cited

U.S. PATENT DOCUMENTS

| 5,111,913 | A | * | 5/1992 | Granbom | 188/67 |
|---|---|---|---|---|---|
| 5,184,700 | A | | 2/1993 | Mainardi | |
| 5,469,940 | A | * | 11/1995 | Yamamoto et al. | 188/67 |
| 5,732,799 | A | * | 3/1998 | Chikamatsu et al. | 188/67 |
| 6,227,336 | B1 | | 5/2001 | Rudy | |
| 6,460,678 | B1 | | 10/2002 | Henk et al. | |
| 7,124,861 | B2 | | 10/2006 | Maher | |
| 7,490,991 | B2 | * | 2/2009 | Naruse et al. | 384/26 |
| 8,061,488 | B2 | * | 11/2011 | Hofmann | 188/106 R |
| 2003/0094334 | A1 | * | 5/2003 | Hsu et al. | 188/67 |
| 2005/0199451 | A1 | * | 9/2005 | Zimmer et al. | 188/67 |
| 2010/0089708 | A1 | * | 4/2010 | Weiss et al. | 188/67 |

(Continued)

FOREIGN PATENT DOCUMENTS
DE 6907934 6/1969
(Continued)

*Primary Examiner* — Christopher Schwartz
(74) *Attorney, Agent, or Firm* — Alan Kamrath; Kamrath IP Lawfirm, PA

(57) ABSTRACT

A linear motion brake (10) includes a channel shaped shoe guide (90) straddling a linear race (20) and having shoe bores (95) defined in leg plates (92) for receiving brake shoes (12). A piston (100) is reciprocally received in a piston cavity (86) of a plate-shaped housing (80) secured to the shoe guide (90). The piston (100) includes first and second protrusions (76, 134) extending from the piston head (102) in the reciprocation direction. Springs (114) are sandwiched between the shoe guide (90) and the piston (100). Ribs (116) of the piston (100) are slideably received in cutouts (96) formed in the connecting plate (94) of the shoe guide (92). Reciprocation of the protrusions (76, 134) cams the brake shoes (12) against the linear race (20).

20 Claims, 5 Drawing Sheets

U.S. PATENT DOCUMENTS

2012/0031713 A1* 2/2012 Zimmer et al. .................. 188/43

FOREIGN PATENT DOCUMENTS

| | | |
|---|---|---|
| DE | 20202803 U1 | 7/2003 |
| DE | 10225353 A1 | 12/2003 |
| DE | 202004019930 U1 | 2/2005 |
| FR | 2580735 A1 | 10/1986 |
| WO | WO 00/74892 A2 | 12/2000 |

* cited by examiner

MOTION CONTROL APPARATUS

BACKGROUND

The present invention generally relates to motion control apparatus and in particular brakes. Specifically, the present invention relates to brakes suitable for use with a track to brake motion such as linear motion, and more specifically relates to linear motion brakes including reduced number of easily fabricated and assembled components and maximizing fluid pressure operative area.

The popularity of linear motion devices in the machine tool, semiconductor, and medical industries has been increasing as the result of their ability to move a load in a linear movement direction to a position with extreme accuracy and at very high speeds. However, problems have been encountered in stopping linearly moving loads especially in the event of a power outage. Specifically, as movement and positioning of the load is dependent upon current being supplied to the linear motor, loads carried by linear motion devices will move under gravitational and/or inertia forces in the event that current is interrupted to the linear motor such as the result of a power outage. This problem is also enhanced in linear motion devices because of the use of high performance linear bearings, which minimize sliding friction. Prior workers have devised a brake that cures the above deficiencies and that works with remarkable reliability and precision, see U.S. Pat. No. 6,460,678 to Henk et al., and U.S. Pat. No. 7,124,861 to Maher.

Thus, a need exists for a brake for stopping linearly moving loads and especially for use with linear motion devices and particularly for use in stopping linearly moving loads that includes a reduced number of easily fabricated and assembled components and that maximizes fluid pressure operative area.

SUMMARY OF THE INVENTION

The present invention solves these needs and other problems in the field of linear motion brakes by providing, in the preferred form, an apparatus including first and second camming surfaces and first and second cam followers respectively formed on either brake shoes or a piston reciprocal in a piston cavity of a housing in a reciprocation direction which is perpendicular to the race and an operation direction. The brake shoes are mounted for movement in a shoe direction perpendicular to the operation direction and the reciprocation direction. The piston is moveable between first and second operative positions by fluid pressure and against a bias. In most preferred aspects of the present invention, the reciprocation direction is perpendicular to the operation direction and to the shoe movement direction.

In preferred aspects, the piston has generally U-shaped cross-sections perpendicular to the operation direction and includes a piston head and first and second protrusions extending generally perpendicularly from the piston head in the reciprocation direction as a single, integrally formed, inseparable component. In further aspects, the first and second protrusions are in the form of yokes which rotatably receives a roller which acts as a cam follower. In other aspects, camming surfaces are integrally formed on the first and second protrusions.

In still other aspects, a channel shaped shoe guide is provided having shoe bores receiving the brake shoes and formed in first and second leg plates and having cutouts slideably receiving ribs formed on the piston and formed in the connecting plate. In further aspects of the present invention, cross-sections of the piston cavity and the piston head perpendicular to the reciprocation direction are generally square to maximize fluid pressure operative area.

In preferred forms, the components of the linear motor brake can be easily machined from stock materials such as plate material to form the housing and channel material to form the shoe guide.

The present invention will become clearer in light of illustrative embodiments of this invention described in connection with the drawings.

DESCRIPTION OF THE DRAWINGS

The illustrative embodiments may best be described by reference to the accompanying drawings where.

Figure 1:
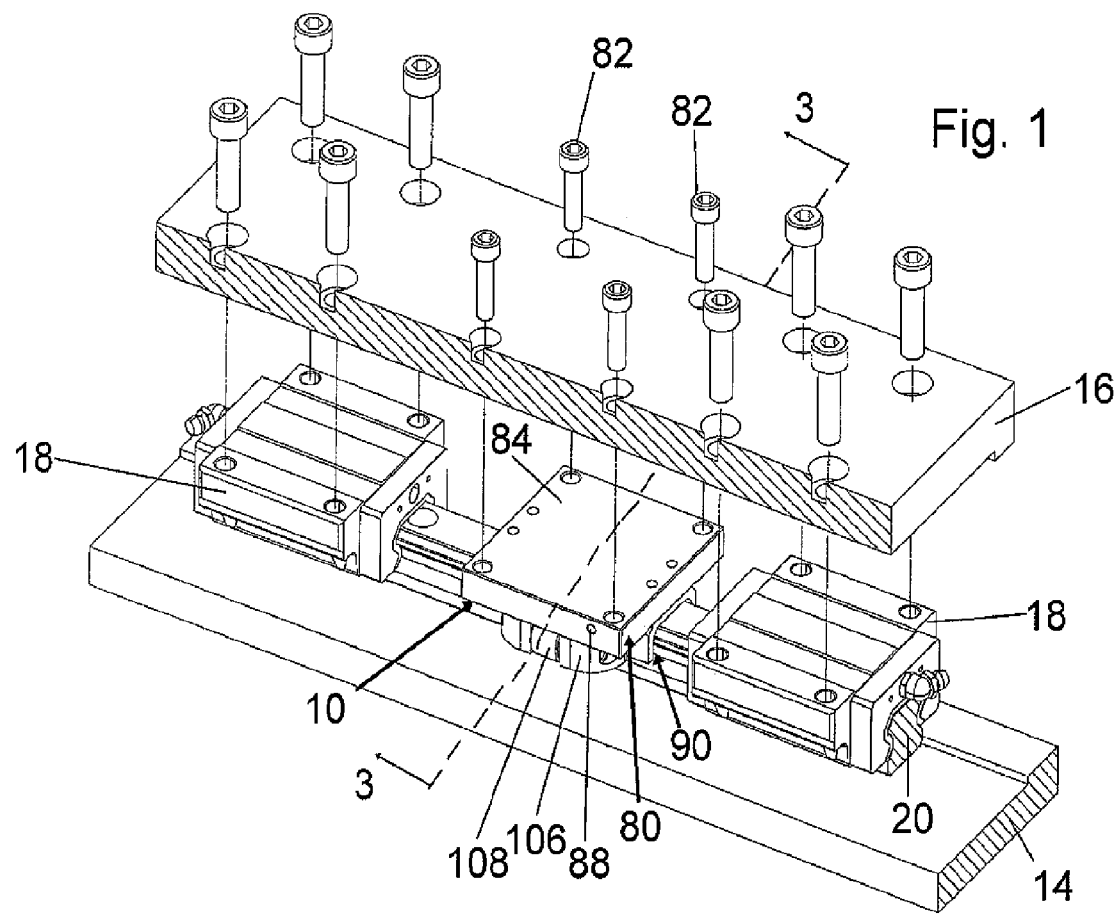
FIG. 1 shows an exploded perspective view of a portion of a linear motion device and a linear motion brake according to the preferred teachings of the present invention.
Figure 2:
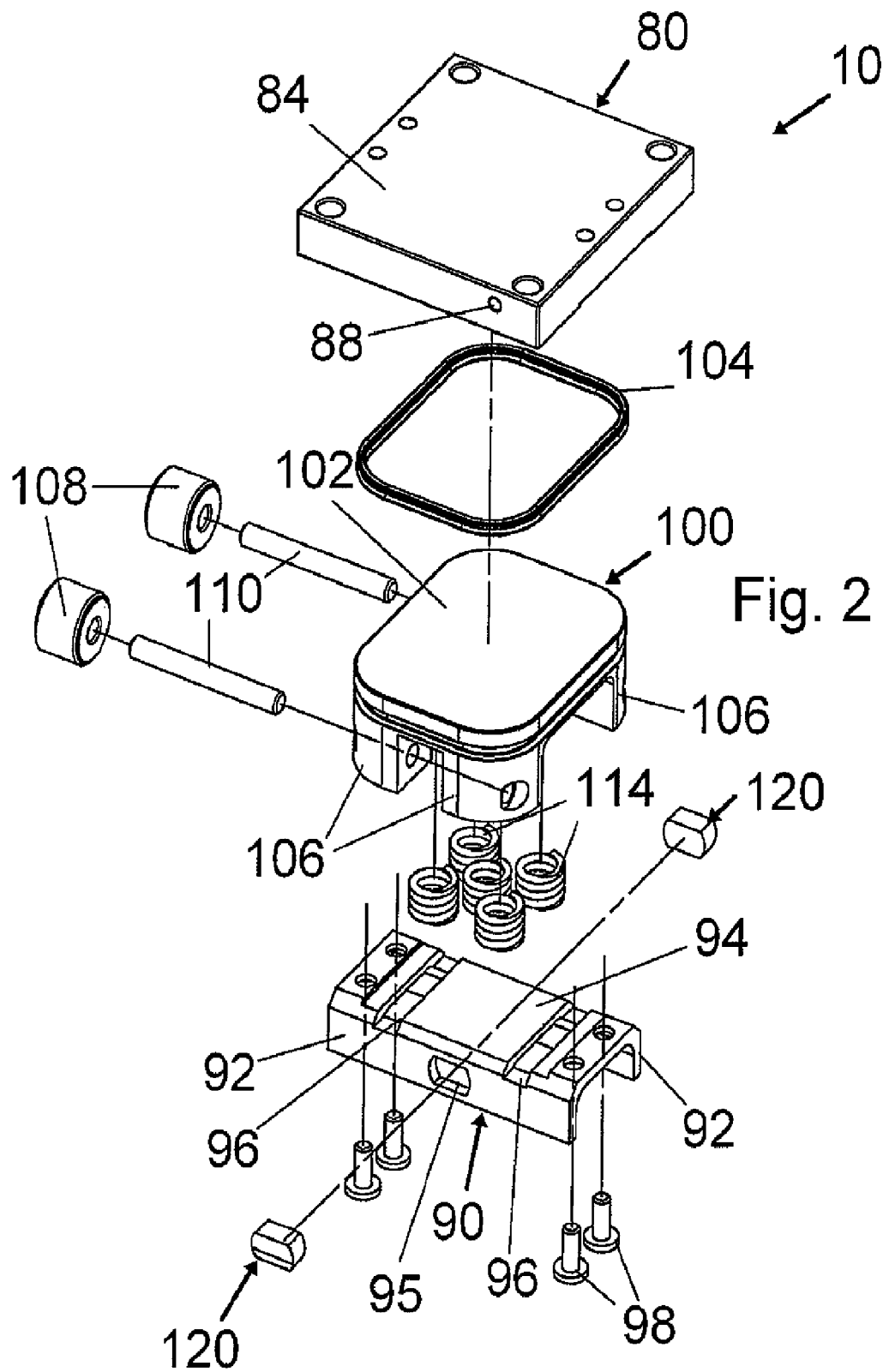
FIG. 2 shows an exploded perspective view of the linear motion brake of FIG. 1.
Figure 3:
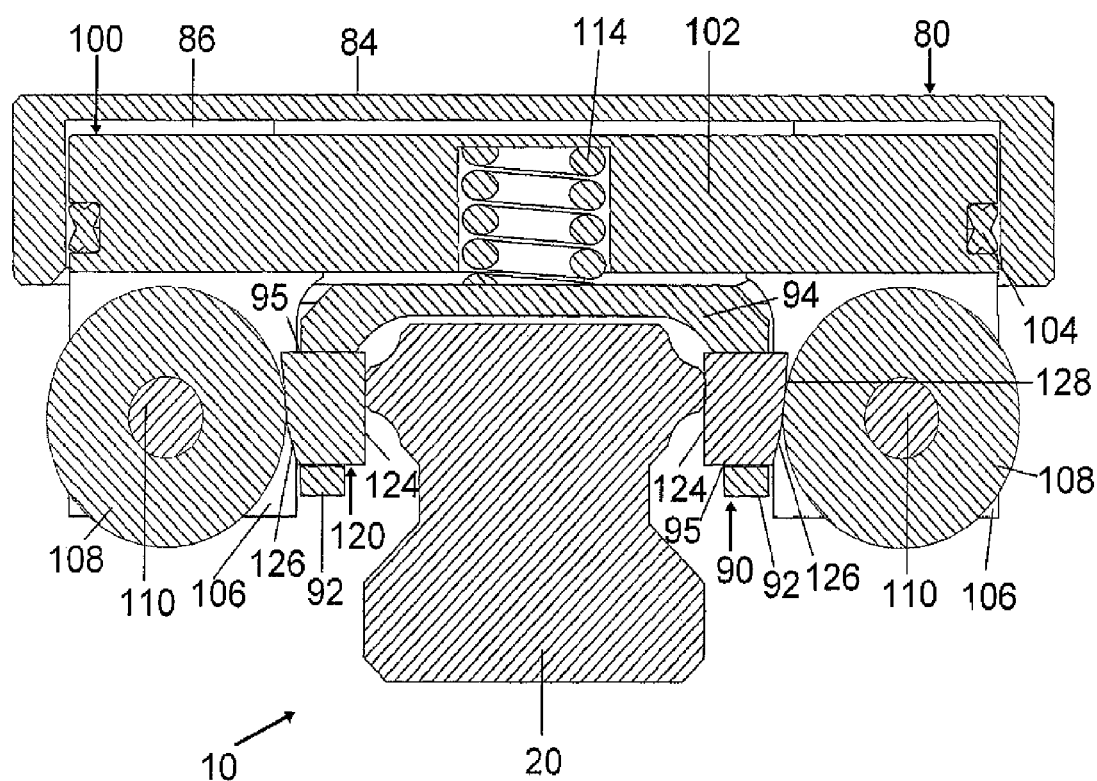
FIG. 3 shows a cross sectional view of the linear motion brake of FIG. 1 according to section line 3-3 of FIG. 1.
Figure 4:
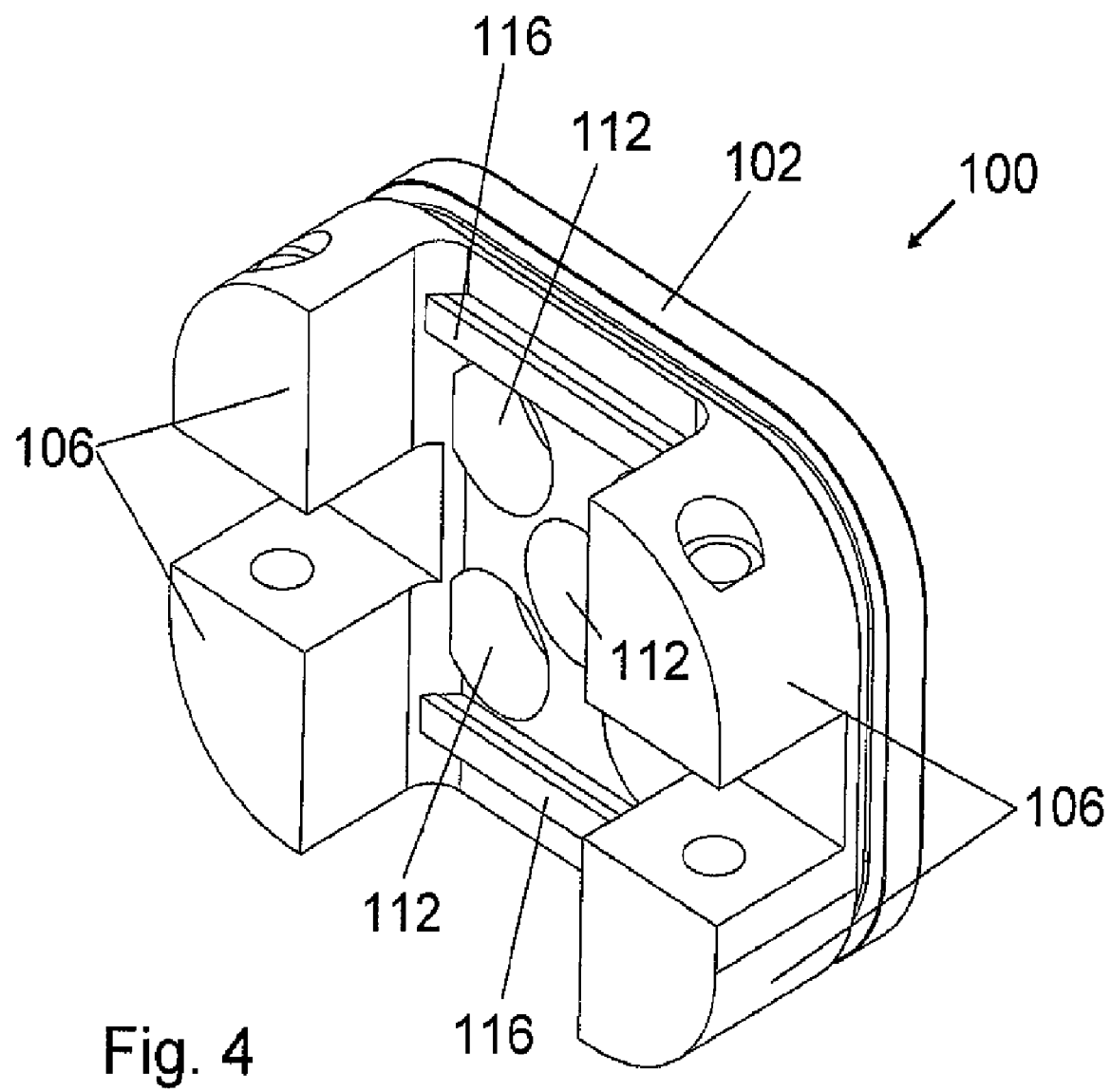
FIG. 4 shows a perspective view of the integral component of the piston of the linear motion brake of FIG. 1.

All figures are drawn for ease of explanation of the basic teachings of the present invention only; the extensions of the figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "first", "second", "inside", "outside", "upper", "lower", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE PREFERRED EMBODIMENTS

A brake for stopping linearly moving loads according to the preferred teachings of the present invention is shown in the drawings and generally designated 10. Brake 10 in its most preferred form is used with a linear motion device such as a linear stage or motor which can be of any conventional design. Generally, linear motion device includes a base plate 14 and a sliding plate 16 mounted for linear motion for a distance relative to the base plate 14 such as by two or more linear bearings 18 slideable upon linear races 20 in a linear movement direction. Sliding plate 16 is driven relative to the base plate 14 such as by an armature secured to sliding plate 16 which slides through a stationary stator secured to the base plate 14. It should be appreciated that the linear motion device according to the teachings of the present invention can have a variety of configurations. Additionally, although having particular application to linear motion devices and believed to produce synergistic results therewith, brake 10 according to the teachings of the present invention may have application to other drives for providing linear motion including but not limited to ball screws, belt drives, air cylinders, and the like.

Brake 10 according to the preferred teachings of the present invention generally includes a brake housing 80 secured to sliding plate 16 such as by bolts 82 extending through sliding plate 16 and threaded into housing 80. Thus, housing 80 is mounted for movement along race 20 in the operation direction. In the most preferred form, housing 80 is in the form of a plate having an upper abutment surface 84 of a square, planar shape for abutment with sliding plate 16. Housing 80 includes a lower surface also of a square, planar shape parallel to and spaced from surface 84, with the lower surface including a piston cavity 86 extending therefrom towards but spaced from surface 84. An inlet 88 extends from one of the edges of housing 80 and is in fluid communication with cavity 86. In the most preferred form, cavity 86 has generally square cross-sections parallel to surface 84 and sliding plate 16, with the corners of the square cross-sections being rounded to allow fabrication.

Brake 10 further includes a shoe guide 90 fixedly connected and secured to housing 80. In the form shown, guide 90 is in the form of a channel and has generally U-shaped cross-sections. Specifically, guide 90 includes first and second leg plates 92 extending from opposite sides of a connecting plate 94. Leg plates 92 are parallel to each other and spaced a distance for receiving race 20 without abutment. Shoe bores 95 are formed in each leg plate 92 spaced from and extending parallel to connecting plate 94. Connecting plate 94 includes first and second rectangular cut-outs 96 extending between leg plates 92 and located on opposite sides of shoe bores 96. In the preferred form, shoe guide 90 is secured to housing 80 by bolts 98 extending through connecting plate 94 and threadably received in housing 80 outwardly of piston cavity 86. To avoid interference, the heads of bolts 98 can be countersunk in the lower surface of connecting plate 94.

Brake 10 according to the teachings of the present invention further includes a piston 100 reciprocally received in piston cavity 86 for reciprocal movement in a reciprocation direction perpendicular to the operation direction. Generally, piston 100 includes a head 102 having an outer periphery having cross-sections perpendicular to the operation direction corresponding to and for slideable receipt in piston cavity 86. Suitable sealing 104 is provided between the outer periphery of head 102 and piston cavity 86 such as a quad ring seal as shown. Piston 100 is reciprocal between a first operative position and a second operative position outwardly of piston cavity 86 in the reciprocation direction. In the most preferred form, piston 100 has generally U-shaped cross-sections perpendicular to the operative direction to straddle race 20. Particularly, first and second protrusions 106 extend from head 102 in a parallel relationship and spaced a distance for receiving shoe guide 90 parallel to and without abutment with leg plates 92. In a first preferred form, each protrusion 106 is in the form of a yoke for supporting a cam follower 108 which in the most preferred form is in the form of a roller rotatable about an axis defined by a pin 110 extending through protrusions 106 parallel to and spaced from leg plates 92.

According to the preferred teachings of the present invention, piston 100 is biased from the second operative position towards the first operative position into piston cavity 86. Specifically, in the most preferred form, head 102 includes a multiplicity of spring cavities 112. Compression coil springs 114 partially located in cavities 112 are sandwiched between head 102 and connecting plate 94. In the most preferred form, piston 100 further includes first and second ribs 116 extending in a spaced, parallel relation between protrusions 106 and on opposite sides of spring cavities 112. Ribs 116 are provided for multiple purposes. Specifically, ribs 116 are slideably received in cutouts 96 of shoe guide 90 to maintain piston 100 in position relative to the shoe guide 90 and housing 80 to counteract the counter-forces placed thereon. Further, the presences of ribs 116 allows the thickness of head 102 to be minimized while still maintaining structural integrity to prevent protrusions 106 from separating due to counter-forces placed thereon.

Brake 10 according to the teachings of the present invention further includes brake shoes 120 of a size and shape slideably received in shoe bores 96 of shoe guide 90 and for movement in a shoe direction defined by shoe bores 96 and perpendicular to the operative direction, to the reciprocal direction and to race 20. In particular, each shoe 120 includes an inner interface surface 122 for interfacing with race 20. Further, each shoe 120 includes an outer cam surface 124 for engagement by cam follower 108. In the most preferred form shown, cam surface 124 includes a first planar portion 126 at an angle in the order of 20° from the reciprocation direction of piston 100. Cam surface 124 includes a second planar portion 128 at an angle in the order of 160° from first planar portion 126 and 5° from the reciprocation direction of piston 100. Second planar portion 128 is located intermediate first planar portion 126 and head 102 of piston 100.

Now that the basic construction of brake 10 according to the preferred teachings of the present invention has been explained, a method of operation and some advantages of brake 10 can be set forth. Specifically, in normal operation of the linear motion device and specifically in other than power outage, emergency stop, parking and similar situations, fluid pressure is provided to the fluid chamber defined by piston cavity 86 and head 102 with sufficient pressure to move piston 100 from the first operative position to the second operative position and out of piston cavity 86 and away from sliding plate 16 and against the bias of springs 114. Thus, cam followers 108 move downwardly relative to brake shoes 120 and are positioned adjacent to first planar portion 126. In such a position, brake shoes 120 are not under compressive forces or sandwiched between cam follower 108 and race 20 such that brake shoes 120 do not grip race 20 and thus permits relative movement of shoe guide 90 and housing 80 relative to race 20. Although shoes 120 may drag or otherwise engage with race 20 in the disengaged position, any operational detriment is offset by the reduction in the number of components and ease of assembly and the operational and constructional advantages obtained thereby.

In the event that fluid pressure is insufficient to offset the biasing force provided by springs 114 in the most preferred form, springs 114 will push piston 100 further into piston cavity 86 and thus cam followers 108 move upwardly relative to brake shoes 120 and roll upon and are positioned on second planar portion 128. In such a position, brake shoes 120 are under compression forces and are sandwiched between cam follower 108 and race 20 such that brake shoes 120 will grip race 20 and thus prevent relative movement of shoe guide 90 and housing 80 relative to race 20. It should be appreciated that the angle of second planar portion 128 to the reciprocation direction of piston 100 provides a wedging affect to enhance the braking by brake 10 according to the teachings of the present invention.

It should be appreciated that the braking force is directly related to the biasing force which is supplied by springs 114 in the preferred form. Furthermore, the biasing force of springs 114 is limited by the reverse force supplied by piston 100 which is a function of fluid pressure and the area of head 102 against which fluid pressure acts. As fluid pressure available is typically from conventional sources, brake 10 according to the teachings of the present invention is advantageous in allowing the area of head 102 to be maximized.

Specifically, in a first aspect, the cross-sections of head 102 and piston cavity 86 are generally square rather than circular of conventional piston/cylinder arrangements. Such a square cross-section increases the area of head 102 over a cylindrical piston having a diameter equal to the length along a side of the square cross-section. Furthermore, in a further aspect, the reciprocation direction is perpendicular to race 20 and to the movement direction of brake 10. Conventional linear brakes utilize pistons having reciprocation directions parallel to race 20 and to the movement direction of brake 10 and utilize placement beside race 20. According to the preferred teachings of the present invention, piston cavity 86 and piston head 102 are located above race 20 and thus can have a pancake type construction to maximize the area of head 102 against which fluid pressure acts. Thus, the reverse force supplied by piston 100 according to the preferred teachings of the present invention can be significantly increased over conventional linear motor brakes.

Brake 10 according to the preferred teachings of the present invention is formed from relatively few components which are easily manufactured and assembled. Specifically, the components of brake 10 which cannot be purchased off the shelf can be easily machined from extruded or conventional stock such as but not limited to channel stock to form shoe guide 90 and plate stock to form housing 80. Likewise, assembly can be quickly performed without requiring extraordinary skill, tools, jigs, or the like.

Brake 10 according to the teachings of the present invention does not utilize pivotal calipers which releasably grip linear race 20 and which could result in uneven wear or other detraction in the efficiency of the linear bearings and race 20. Brake 10 applies all braking force as a result of movement of protrusions 106 solely in the reciprocation directly resulting in movement of brake shoes 120 solely in the shoe direction. Additionally, as race 20 is sandwiched between a pair of brake shoes 120 in brake 10 in the preferred form of the present invention, side loading of the linear bearing and race 20 is minimized especially in comparison to if a single friction facing was engaged.

Figure 5:
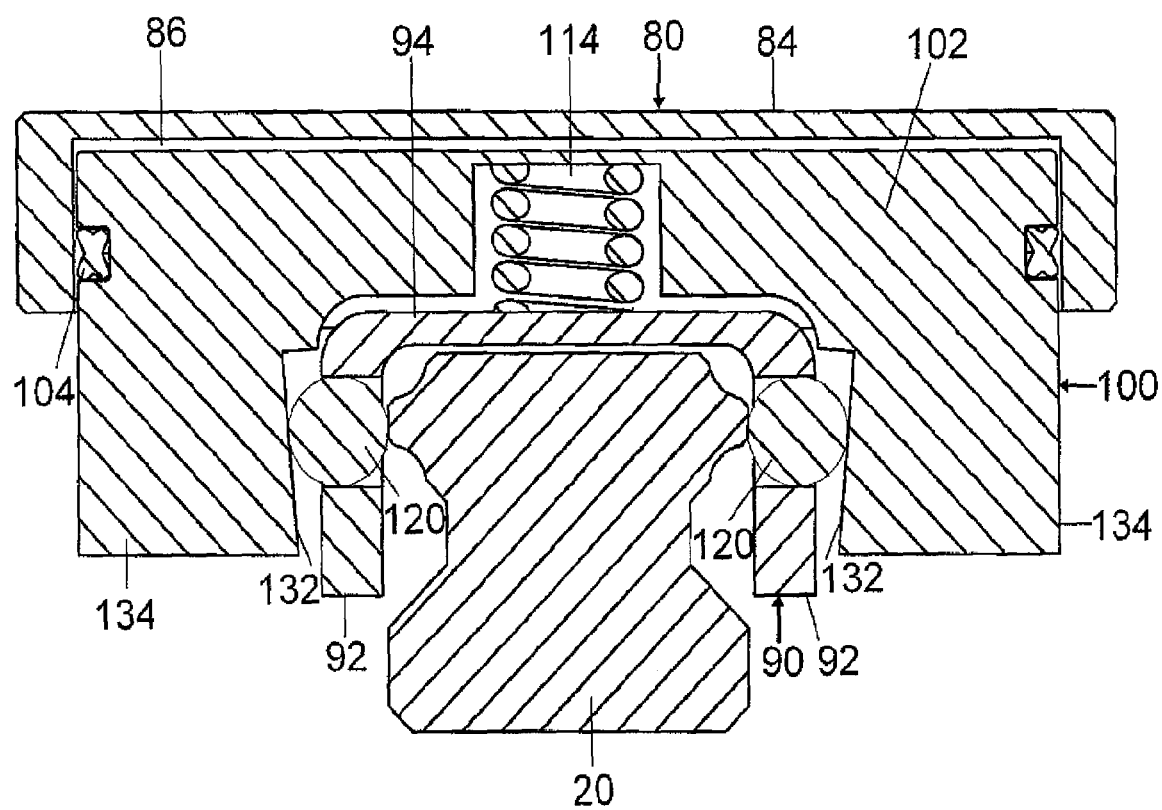
FIG. 5 shows a cross-sectional view of an alternate embodiment of a linear motion brake according to the preferred teachings of the present invention.

Now that the basic teachings of the present invention have been explained, many extensions and variations will be obvious to one having ordinary skill in the art. As an example, although cam followers 108 of the preferred form are shown as mounted to piston 100 for movement relating to camming surface 124 formed on brake shoes 120 which is believed to produce synergistic results including, but not limited to, reduced wear on components, other manners for reciprocating brake shoes 120 as the result of reciprocation of piston 100 can be utilized according to the teachings of the present application. As an example, as shown in FIG. 5, the cam follower 108 could be incorporated into brake shoes 130 which are shown in the preferred form as balls. Camming surfaces 132 are formed on protrusions 134 (replacing protrusions 106) and engage with brake shoes 130, with the camming surface 132 having greater spacing from race 20 with downward reciprocation of piston 100 by fluid pressure.

Further, although brake 10 in the most preferred form has special application for stopping linear motion of a linear motion device, brake 10 and/or features thereof would produce beneficial results to other applications for controlling motion according to the teachings of the present invention including but not limited to controlling rotational motion.

Additionally, although brake 10 of the most preferred form includes the combination of several, unique features believed to obtain synergistic results, brakes 10 could be constructed according to the teachings of the present invention including such features single or in other combinations. As an example, brake 10 could be constructed with piston cavity 86 and piston head 102 of a different cross-section than as shown and described in the preferred form.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Linear motion brake for a race comprising, in combination:

a housing adapted to be mounted for movement along a race in an operation direction, with the housing including a piston cavity; a piston reciprocally received in the piston cavity for reciprocal movement in a reciprocation direction perpendicular to the operation direction between a first operative position and a second operative position outwardly of the piston cavity in the reciprocation direction, with the piston being biased from the second operative position to the first operative position, with fluid pressure being introducible into the piston cavity against the piston for moving the piston from the first operative position to the second operative position; first and second brake shoes mounted for movement in a shoe direction perpendicular to the operation direction and to the reciprocation direction, with one of the piston and the first and second brake shoes including first and second camming surfaces and the other of the piston and the first and second brake shoes including first and second cam followers engaging with the first and second camming surfaces causing movement of the brake shoes in the shoe direction when the piston reciprocates in the reciprocation direction; and a shoe guide of a generally channel shape and secured to the housing, with the shoe guide including first and second leg plates and a connecting plate extending between the first and second leg plates, with the first and second leg plates including shoe bores extending in the shoe direction through the first and second leg plates for receiving the first and second brake shoes, with the piston being biased away from the connecting plate and with the piston being moved under fluid pressure towards the connecting plate.

2. The linear motion brake of claim 1 wherein cross-sections of the piston cavity and piston head perpendicular to the reciprocation direction are parallel to a plane extending parallel to the operation direction and to the shoe direction.

3. The linear motion brake of claim 2 wherein the cross-sections of the piston cavity and the piston are generally square to maximize fluid pressure operative area.

4. The linear motion brake of claim 3 wherein the piston has a generally U-shaped cross-sections perpendicular to the operation direction and includes a piston head and first and second protrusions extending generally perpendicular from the piston head in the reciprocation direction and on opposite sides of the race.

5. The linear motion brake of claim 4 wherein the connecting plate of the shoe guide includes first and second cutouts extending between the first and second leg plates and on opposite sides of the shoe bores, with the piston including first and second ribs slideably received in the first and second cutouts of the shoe guide for limiting movement of the piston to the reciprocation direction.

6. The linear motion brake of claim 5 further comprising a plurality of springs extending between the shoe guide and the piston for biasing the piston from the second operative position to the first operative position, with the piston including a plurality of spring cavities for receiving the plurality of springs.

7. The linear motion brake of claim 6 wherein the first and second protrusions are each in the form of yokes, with the cam followers comprising a roller rotatably mounted in the yoke, with the shoe brakes each comprising an interface surface for engaging with the race and the cam surface opposite to the interface surface in the shoe direction for engaging with the roller.

8. The linear motion brake of claim 7 wherein the cam surface comprises a first planar portion at an angle in the order of 20° from the reciprocation direction and a second planar portion extending from the first planar portion at an angle in the order of 5°.

9. The linear motion brake of claim 6 wherein the first and second protrusions include the cam surfaces, with the brake shoes defining the cam followers.

10. The linear motion brake of claim 9 wherein each of the first and second brake shoes is in the shape of a ball received in the shoe bores.

11. The linear motion brake of claim 4 wherein the housing is in the form of a plate having an abutment, upper surface and an opposing lower surface, with the piston cavity extending from the lower surface towards but spaced from the upper surface, with the lower surface abutting with the connecting plate of the shoe guide.

12. The linear motion brake of claim 11 with the upper and lower surfaces each being of a square, planar shape, with the lower surface being parallel to but spaced from the upper surface, with the abutment, upper surface including threaded openings for receiving bolts for attaching a sliding plate.

13. The linear motion brake of claim 4 wherein the piston head and first and second protrusions are integrally formed as a single, unseparable component.

14. The linear motion brake of claim 2 further comprising a quad ring seal mounted to the piston and slideable in the piston cavity.

15. The linear motion brake of claim 1 wherein the piston has a generally U-shaped cross-sections perpendicular to the operation direction and includes a piston head and first and second protrusions extending generally perpendicular from the piston head in the reciprocation direction and on opposite sides of the race.

16. The linear motion brake of claim 15 wherein the connecting plate of the shoe guide includes first and second cutouts extending between the first and second leg plates and on opposite sides of the shoe bores, with the piston including first and second ribs slideably received in the first and second cutouts of the shoe guide for limiting movement of the piston to the reciprocation direction, with the first and second ribs formed on the piston head and extending between the first and second protrusions.

17. The linear motion brake of claim 16 further comprising a plurality of springs extending between the shoe guide and the piston for biasing the piston from the second operative position to the first operative position, with the piston including a plurality of spring cavities for receiving the plurality of springs.

18. The linear motion brake of claim 17 wherein the housing is in the form of a plate having an abutment, upper surface and an opposing lower surface, with the piston cavity extending from the lower surface towards but spaced from the upper surface, with the lower surface abutting with the connecting plate of the shoe guide.

19. The linear motion brake of claim 18 with the upper and lower surfaces each being of a square, planar shape, with the lower surface being parallel to but spaced from the upper surface, with the abutment, upper surface including threaded openings for receiving bolts for attaching a sliding plate.

20. The linear motion brake of claim 15 wherein the first and second protrusions are each in the form of yokes, with the cam followers comprising a roller rotatably mounted in the yoke, with the shoe brakes each comprising an interface surface for engaging with the race and the cam surface opposite to the interface surface in the shoe direction for engaging with the roller.

* * * * *

UNITED STATES PATENT AND TRADEMARK OFFICE
CERTIFICATE OF CORRECTION

PATENT NO. : 8,220,592 B2  
APPLICATION NO. : 12/447284  
DATED : July 17, 2012  
INVENTOR(S) : Dave Hein et al.

Page 1 of 1

It is certified that error appears in the above-identified patent and that said Letters Patent is hereby corrected as shown below:

Column 1, line 66, insert paragraph after "necting plate."

Signed and Sealed this
Eighteenth Day of September, 2012

David J. Kappos
*Director of the United States Patent and Trademark Office*